US008352684B2

(12) United States Patent
Archambault et al.

(10) Patent No.: US 8,352,684 B2
(45) Date of Patent: Jan. 8, 2013

(54) OPTIMAL CACHE REPLACEMENT SCHEME USING A TRAINING OPERATION

(75) Inventors: Roch Georges Archambault, North York (CA); Shimin Cui, Toronto (CA); Chen Ding, Rochester, NY (US); Yaoqing Gao, North York (CA); Xiaoming Gu, Handan (CN); Raul Esteban Silvera, Woodbridge (CA); Chengliang Zhang, Redmond, WA (US)

(73) Assignee: International Business Machines Corporation, Armonk, NY (US)

( * ) Notice: Subject to any disclaimer, the term of this patent is extended or adjusted under 35 U.S.C. 154(b) by 990 days.

(21) Appl. No.: 12/236,188

(22) Filed: Sep. 23, 2008

(65) Prior Publication Data

US 2010/0077153 A1   Mar. 25, 2010

(51) Int. Cl.
*G06F 12/00* (2006.01)
(52) U.S. Cl. .......................... 711/133; 711/136; 711/159
(58) Field of Classification Search .................. 711/133, 711/136, 159
See application file for complete search history.

(56) References Cited

U.S. PATENT DOCUMENTS

| | | | | |
|---|---|---|---|---|
| 5,305,389 | A * | 4/1994 | Palmer | 382/305 |
| 5,761,716 | A | 6/1998 | Byrn et al. | |
| 6,058,456 | A * | 5/2000 | Arimilli et al. | 711/129 |
| 6,163,773 | A * | 12/2000 | Kishi | 706/16 |
| 6,336,167 | B1 | 1/2002 | Jeffries et al. | |
| 7,793,049 | B2 | 9/2010 | Cain et al. | |
| 8,190,824 | B2 | 5/2012 | Shen et al. | |
| 2002/0152361 | A1 * | 10/2002 | Dean et al. | 711/160 |
| 2003/0110357 | A1 | 6/2003 | Nguyen et al. | |
| 2009/0089509 | A1 * | 4/2009 | Shen et al. | 711/136 |
| 2009/0113135 | A1 * | 4/2009 | Cain et al. | 711/135 |

OTHER PUBLICATIONS

Kampe et al., "Self-Correcting LRU Replacement Policies", Conference—In Proceedings of the 1st Conference on Computing Frontiers, 2004, pp. 1-10.
Belady, "A Study of Replacement Algorithms for a Virtual-Storage Computer," IBM Systems Journal, 5(2):78-101, 1966.
Beyls et al., "Generating Cache Hints for Improved Program Efficiency," Journal of Systems Architecture, 51 (4):223-250, 2005.
Beyls et al., "Reuse Distance-Based Cache Hint Selection," Proceedings of the 8th International Euro-Par Conference, Paderborn Germany, Aug. 2002, 10 pages.
Cascaval et al., "Estimating Cache Misses and Locality Using Stack Distances," Proceedings of International Conference on Supercomputing, San Francisco, California, Jun. 2003, 10 pages.

(Continued)

*Primary Examiner* — Hong Kim
(74) *Attorney, Agent, or Firm* — Yee & Associates, P.C.; David Mims

(57) ABSTRACT

Computer implemented method, system and computer usable program code for cache management. A cache is provided, wherein the cache is viewed as a sorted array of data elements, wherein a top position of the array is a most recently used position of the array and a bottom position of the array is a least recently used position of the array. A memory access sequence is provided, and a training operation is performed with respect to a memory access of the memory access sequence to determine a type of memory access operation to be performed with respect to the memory access. Responsive to a result of the training operation, a cache replacement operation is performed using the determined memory access operation with respect to the memory access.

17 Claims, 7 Drawing Sheets

OTHER PUBLICATIONS

Ding et al., "Improving Effective Bandwidth Through Compiler Enhancement of Global and Dynamic Cache Reuse," Journal of Parallel and Distributed Computing, 64(1):108-134, 2004.

Fang et al., "Instruction Based Memory Distance Analysis and its Application to Optimization," Proceedings of International Conference on Parallel Architectures and Compilation Techniques, St. Louis, Missouri, 2005, 12 pages.

Marin et al., "Scalable Cross-Architecture Predictions of Memory Hierarchy Response for Scientific Applications," Proceedings of the Symposium of the Las Alamos Computer Science Institute, Sante Fe, New Mexico, 2005, 12 pages.

Mattson et al., "Evaluation Techniques for Storage Hierarchies," IBM System Journal, 9(2):78-117, 1970.

McCalpin, "STREAM: Sustainable Memory Bandwidth in High Performance Computers," http://www.cs.virginia.edu/stream/, 2006, 5 pages.

Petrank et al., "The Hardness of Cache Conscious Data Placement," Proceedings of ACM Symposium on Principles of Programming Languages, Portland Oregon, Jan. 2002, 11 pages.

Sleator et al., "Amortized Efficiency of List Update and Paging Rules," Communications of the ACM, 28(2):202-208, Feb. 1985.

Wang et al., "Using the Compiler to Improve Cache Replacement Decisions," Proceedings of International Conference on Parallel Architectures and Compilation Techniques, Charlottesville, Virginia, Sep. 2002, 10 pages.

\* cited by examiner

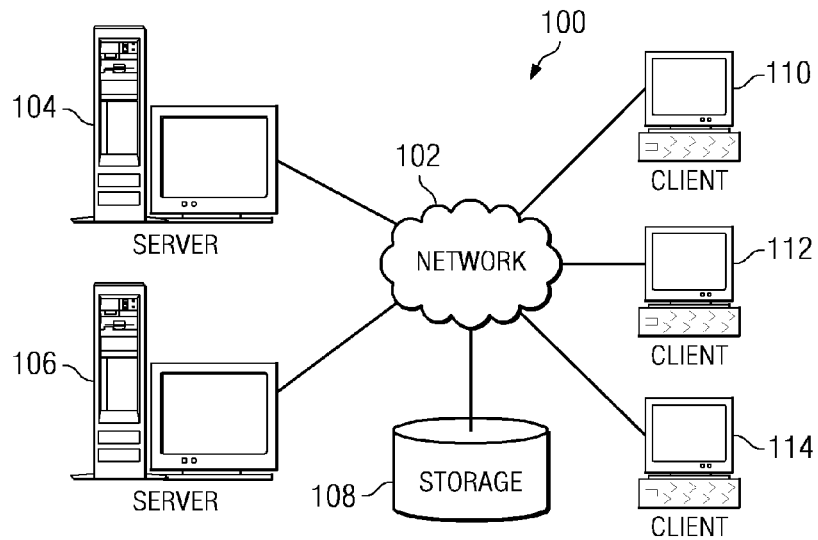
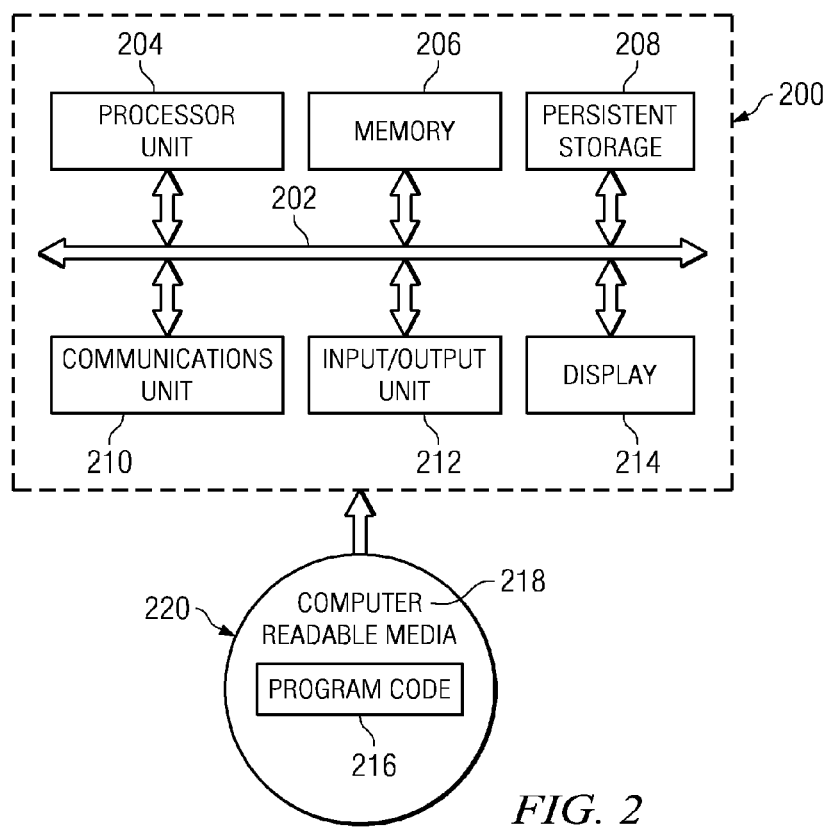
FIG. 1
FIG. 2

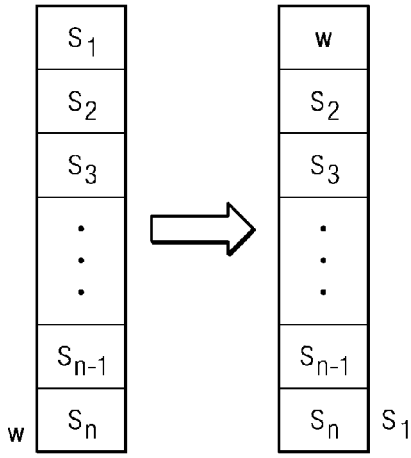

FIG. 5A

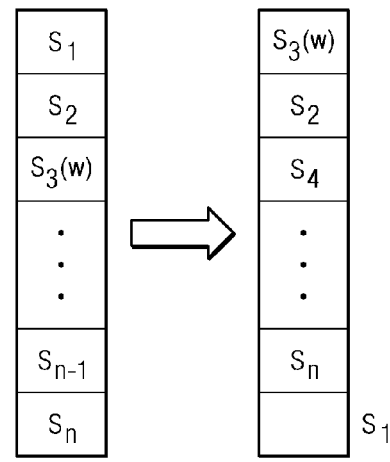

FIG. 5B

```
PSEUDO CODE FOR OPT*:

1. CALCULATE FORWARD TIME DISTANCE
2. TRAVERSE THE TRACE
        a) MOVE TO THE NEXT ACCESS A
        b) COMPARE THE TIME DISTANCE OF THE DATA ELEMENT VISITED BY A AND
TIME DISTANCES OF THE DATA ELEMENTS IN CACHE.
                DON'T NEED TO DO UPDATE.
                KEEP A HEAP FOR THE PRIORITIES OF THE DATA ELEMENTS IN CACHE BASED
ON TIME DISTANCE.
                THE ROOT OF THE HEAP IS THE FARTHEST REUSED DATA ELEMENT IN CACHE.
        c) DECIDE THE EVICTION IF THE ACCESS IS A MISS AND CACHE IS ALREADY FULL.
                THERE IS A HASH TABLE FOR FINDING THE DATA ELEMENT IN HEAP BY AN
ACCESS.
                IF AN ACCESS IS A HIT, FIND ITS DATA ELEMENT IN THE HEAP THROUGH THE
HASH TABLE AND ADJUST ITS DATA ELEMENT IN THE HEAP ACCORDING TO THE NEW
TIME DISTANCE.
                IF AN ACCESS IS A MISS AND CACHE IS NOT FULL, BUILD AN ENTRY FOR THIS
DATA ELEMENT VISITED BY THIS ACCESS IN THE HASH TABLE AND PUT THIS DATA ELEMENT
INTO THE HEAP ACCORDING TO THIS TIME DISTANCE.
                IF AN ACCESS IS A MISS AND CACHE IS FULL, DELETE THE ENTRY IN THE HEAP
FOR THE ROOT OF HEAP AND DELETE THE ROOT NODE OF THE HEAP AND ADJUST THE HEAP,
BUILD AN ENTRY FOR THE NEW DATA ELEMENT VISITED BY THIS ACCESS IN THE HASH TABLE
AND PUT IT INTO THE HEAP ACCORDING TO THIS TIME DISTANCE.
```

| TRACE | a | b | c | d | e | e | d | c | b | a |
|---|---|---|---|---|---|---|---|---|---|---|
| BYPASSES | X | X | | | | | | X | X | |
| BYPASS LRU STACK | a | b | c | d c | e d c | e d c | d e c | d e c | d e b | a d e |
| MISSES | 1 | 2 | 3 | 4 | 5 | | | | 6 | 7 |
| OPT* STACK | a | b a | c b a | d c b | e d c | e d c | d e c | c d e | b d e | a d e |
| MISSES | 1 | 2 | 3 | 4 | 5 | | | | 6 | 7 |

FIG. 8

| TRACE | a | b | c | d | d | c | e | b | e | c | d |
|---|---|---|---|---|---|---|---|---|---|---|---|
| BYPASS | X | X | | | X | X | | | X | X | |
| BYPASS LRU STACK | a | b | c | d c | c d | d c | e d | b e | b e | b c | d b |
| MISSES | 1 | 2 | 3 | 4 | | | 5 | 6 | | 7 | 8 |
| OPT* STACK | a | b a | c b | d c | d c | c d | e c | b e | e b | c b | d b |
| MISSES | 1 | 2 | 3 | 4 | | | 5 | 6 | | 7 | 8 |

FIG. 9

| TRACE | a | b | c | d | d | c | e | b | e | c | d |
|---|---|---|---|---|---|---|---|---|---|---|---|
| BYPASS | X | | | | X | | | | X | | |
| BYPASS LRU STACK | a | b | c b | d c b | c b d | c b d | e c b | b e c | e b c | e b c | d e b |
| MISSES | 1 | 2 | 3 | 4 | | | 5 | | | | 6 |
| OPT* STACK | a | b a | c b a | d c b | d c b | c d b | e c b | b e c | e b c | c e b | d e b |
| MISSES | 1 | 2 | 3 | 4 | | | 5 | | | | 6 |

| TRACE | a | b | c | d | e | e | d | c | b | a |
|---|---|---|---|---|---|---|---|---|---|---|
| TRESPASS | | X | X | | | | | | X | X |
| TRESPASS LRU STACK | a | b | c | d c | e d c | e d c | d e c | c d e | b d e | a d e |
| MISSES | 1 | 2 | 3 | 4 | 5 | | | | 6 | 7 |
| OPT* STACK | a | b a | c b a | d c b | e d c | e d c | d e c | c d e | b d e | a d e |
| MISSES | 1 | 2 | 3 | 4 | 5 | | | | 6 | 7 |

*FIG. 10*

| TRACE | a | b | c | d | d | c | e | b | e | c | d |
|---|---|---|---|---|---|---|---|---|---|---|---|
| TRESPASS | | X | X | | | X | X | | | X | X |
| TRESPASS LRU STACK | a | b | c | d c | d c | c | e | b e | e b | c b | d b |
| MISSES | 1 | 2 | 3 | 4 | | | 5 | 6 | | 7 | 8 |
| OPT* STACK | a | b a | c b | d c | d c | c d | e c | b e | e b | c b | d b |
| MISSES | 1 | 2 | 3 | 4 | | | 5 | 6 | | 7 | 8 |

*FIG. 11*

| TRACE | a | b | c | d | d | c | e | b | e | c | d |
|---|---|---|---|---|---|---|---|---|---|---|---|
| TRESPASS | | X | | | | X | | | | | X |
| TRESPASS LRU STACK | a | b | c b | d c b | d c b | c b | e c b | b e c | e b c | c e b | d e b |
| MISSES | 1 | 2 | 3 | 4 | | | 5 | | | | 6 |
| OPT* STACK | a | b a | c b a | d c b | d c b | c d b | e c b | b e c | e b c | c e b | d e b |
| MISSES | 1 | 2 | 3 | 4 | | | 5 | | | | 6 |

*FIG. 12*

FIG. 13A
```
int a[1000] ;
for (j =1 ; j<=10 ; j++)
  for (i =1 ; i<=997 ; i++)
    a[i+2]= a[ i -
1]+a[i+1] ;
```
FIG. 13B
```
int a[1000] ;
for (j =1 ; j<10 ; j++)    {
  for (i =1 ; i<=509 ; i++)
    a[i+2]— a[ i -
1]+a[i+1] ;
  for ( ; i<=996 ; i++)
    a[i+2]=a[i-
1]+a[i+1] ;
  for ( ; i<=997 ; i++)
    a[i+2]=a[i-
1]+a[i+1] ;
}
```
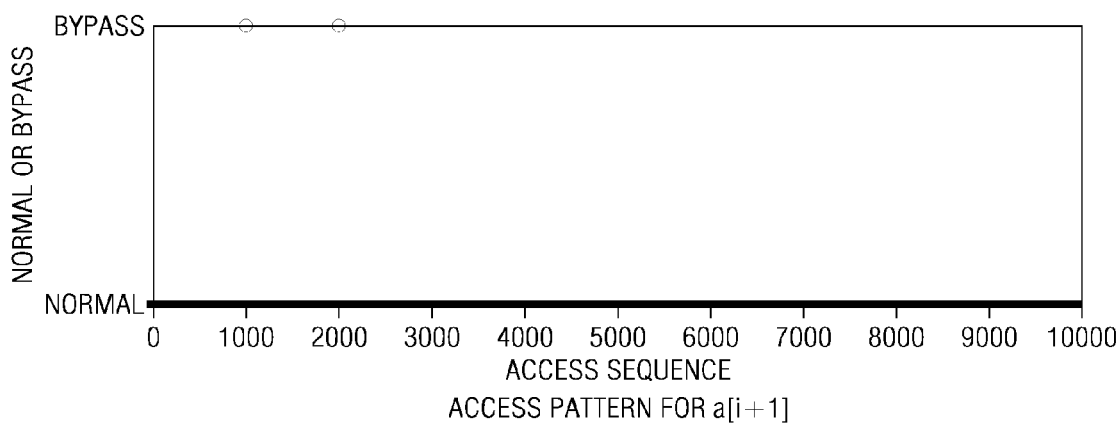
FIG. 14A
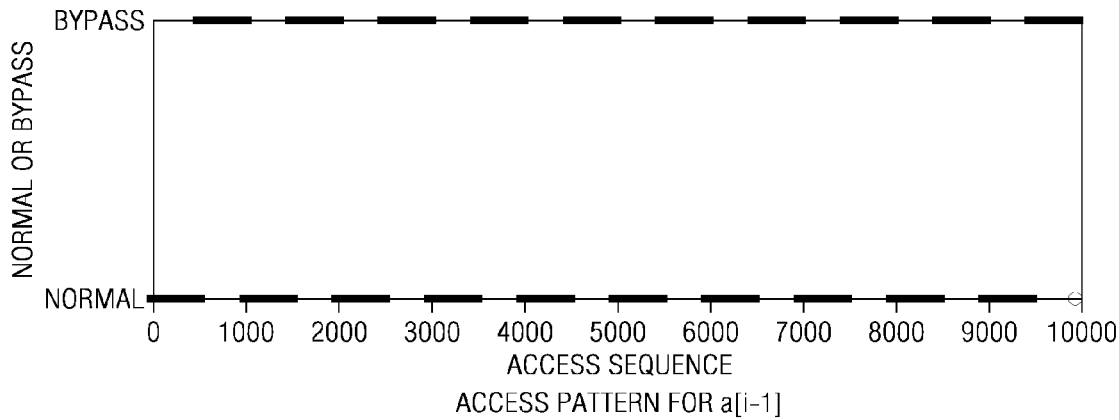
FIG. 14B

OPTIMAL CACHE REPLACEMENT SCHEME USING A TRAINING OPERATION

BACKGROUND OF THE INVENTION

1. Field of the Invention

The present invention relates generally to the data processing field and more specifically to a computer implemented method, system and computer usable program code for providing optimal cache management.

2. Background Description

It is anticipated that cache performance, particularly the cache miss rate, will play a much greater role in determining the performance of multi-core or chip multi-processors than it currently does on single-core systems. Reasons for this include the limited memory bandwidth and longer memory latency relative to CPU speed in today's machines. On known multi-processor systems, the available memory bandwidth usually increases because each processor adds its own connections. On chip multi-processors, all the CPUs share the same connection. A recent report has shown that while a single thread on an Intel Core 2 Quad Q6600 machine sustained a 5.8 GB/s memory data transfer rate, using four threads would achieve only 5.3 GB/s in total memory transfer.

Not only is the memory bandwidth inadequate—each core on the Intel Core 2Quad Q6600 is capable of 19 billion 64-bit floating point operations a second—the same bandwidth is shared by all cores. If one thread has a high miss rate, therefore, it may saturate the memory bus and render other cores useless.

Unlike the problem of memory latency, bandwidth limitations cannot be alleviated by data prefetching or multi-threading. The primary solution is to reduce the amount of memory transfer by reducing the miss rate of a program. The problem of optimal caching is NP-hard if computation and data reorganization are considered. If the problem is limited by assuming that the computation order and the data layout are fixed, the best caching is given by the optimal replacement strategy "MIN". The MIN procedure, however, requires an arbitrary look ahead and, as a result, cannot be implemented efficiently in hardware. Accordingly, today's machines frequently use the well-known "LRU" (least recently used) replacement strategy. It is known, however, that LRU replacement can be worse than MIN by a factor proportional to the cache size.

Recent architecture designs have added an interface for a compiler, when generating machine code, to influence hardware cache management during execution. Techniques include using available cache-hint instructions to specify which level of cache to load a block into, and using an evictme bit which, if set, informs the hardware to replace the block in cache first when space is needed. These two techniques are based on the observation that a program has multiple working sets—some are larger than cache and some are smaller. The goal of both methods is to keep the large working sets out in order to hold the small working sets in cache and undisturbed.

There is, accordingly, a need for a cache management mechanism that can be efficiently implemented and, at the same time, provide an optimal replacement strategy.

BRIEF SUMMARY OF THE INVENTION

According to one embodiment of the present invention, a cache management scheme is provided. A cache is provided, wherein the cache is viewed as a sorted array of data elements, wherein a top position of the array is a most recently used position of the array and a bottom position of the array is a least recently used position of the array. A memory access sequence is provided, and a training operation is performed with respect to a memory access of the memory access sequence to determine a type of memory access operation to be performed with respect to the memory access. Responsive to a result of the training operation, a cache replacement operation is performed using the determined memory access operation with respect to the memory access.

BRIEF DESCRIPTION OF THE SEVERAL VIEWS OF THE DRAWINGS

FIG. 1 depicts a pictorial representation of a network of data processing systems in which illustrative embodiments may be implemented;

FIG. 2 is a diagram of a data processing system in accordance with an illustrative embodiment of the present invention;

FIG. 3A illustrates the normal operation when there is a miss, and FIG. 3B illustrates the normal operation when there is a hit;

FIG. 4A illustrates the bypass operation when there is a miss, and FIG. 4B illustrates the bypass operation when there is a hit;

FIGS. 5A and 5B schematically illustrate a trespass access operation in accordance with an illustrative embodiment of the invention. FIG. 5A illustrates the trespass operation when there is a miss, and FIG. 5B illustrates the trespass operation when there is a hit;

FIG. 6 illustrates pseudo code for an OPT* cache management scheme according to an illustrative embodiment of the invention;

FIG. 7 is a table that illustrates an example of Bypass LRU execution according to an illustrative embodiment of the invention;

FIG. 8 is a table that illustrates a Bypass LRU, cache size=2 according to an illustrative embodiment of the invention;

FIG. 9 is a table that illustrates a Bypass LRU, cache size=3 according to an illustrative embodiment of the invention;

FIG. 10 is a table that illustrates an example of Trespass LRU execution according to an illustrative embodiment of the invention;

FIG. 11 is a table that illustrates a Trespass LRU, cache size=2 according to an illustrative embodiment of the invention;

FIG. 12 is a table that illustrates a Trespass LRU, cache size=3 according to an illustrative embodiment of the invention;

FIG. 13A illustrates an example of an original Bypass LRU code and FIG. 13B illustrates a transformed Bypass LRU code according to an illustrative embodiment of the invention;

FIGS. 14A, 14B and 14C are diagrams that illustrate whether an access is a bypass access for three references to assist in explaining illustrative embodiments of the invention;

DETAILED DESCRIPTION OF THE INVENTION

Figure 3A:
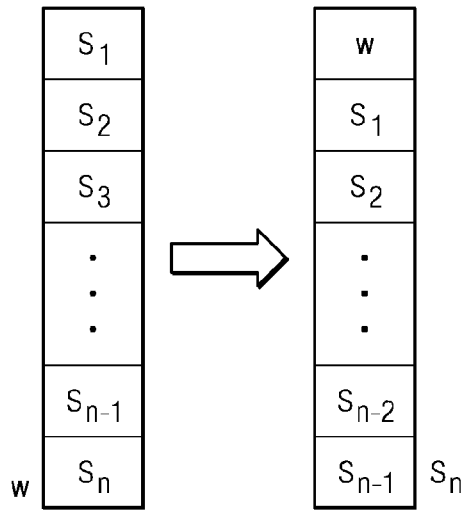
FIGS. 3A and 3B schematically illustrate a normal access operation to assist in explaining illustrative embodiments of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments provide a computer implemented method, system and computer usable program code for cache management that can be efficiently implemented and, at the same time, provide an optimal replacement strategy. To facilitate a clear understanding of the illustrative embodiments, some terms that are used in the following detailed description are first defined.

The term "access" as used herein means a memory operation (load/store operation) at runtime, and the term "reference" as used herein means a memory instruction (load/store operation) in the binary executable. An access may be a "hit" or a "miss", depending on whether or not the visited data element is in cache immediately before the access.

The operation of an access includes three parts: the "placement" of a visited element, the "replacement" of an existing element if the cache is full, and the "shift" of the positions or priorities of other elements. The shift may or may not be an actual action in hardware, depending on the implementation.

In the illustrative embodiments described herein, a "cache" is viewed as being a stack or a sorted array. The data element at the top of the array has the highest priority and should be the last to evict, and the data element at the bottom of the array is the next to evict when space is needed.

Current cache management schemes include the "MIN", "OPT" and "LRU" cache management schemes. The MIN scheme provides an optimal cache replacement strategy but requires forward scanning to select the cache element that has the furthest reuse, and, for this reason, the scheme has a high replacement cost. The OPT scheme utilizes a two-pass stack algorithm which computes the forward reuse distance in the first pass and then, in the second pass, maintains a priority list based on the pre-computed forward reuse distance, and also provides an optimal replacement strategy. The main cost of OPT is in replacement too, however, the cost is lower than in MIN.

In comparison to the MIN and OPT schemes, the LRU placement cost is constant. The LRU scheme places the visited element at the top of the LRU stack, which is referred to as the "Most Recently Used" (MRU) position, and it evicts the bottom element, which is referred to as the "Least Recently Used" (LRU) position.

Illustrative embodiments provide a computer implemented method, system and computer usable program code for cache management. In accordance with illustrative embodiments, two program-assisted cache management schemes are provided, generally referred to herein as "Bypass LRU" and "Trespass LRU". As will become apparent in the following description, both the Bypass LRU scheme and the Trespass LRU scheme are as efficient as the LRU scheme, yet they provide the same optimal results as the OPT and MIN schemes. The Trespass LRU scheme is a stack method, while the Bypass LRU scheme is not. Both require training analysis, for which a modified OPT method, referred to herein as "OPT*", is used. In an ideal case in which the operation of each access can be individually specified, simple additions to the LRU management scheme can produce optimal results.

Figure 3B:
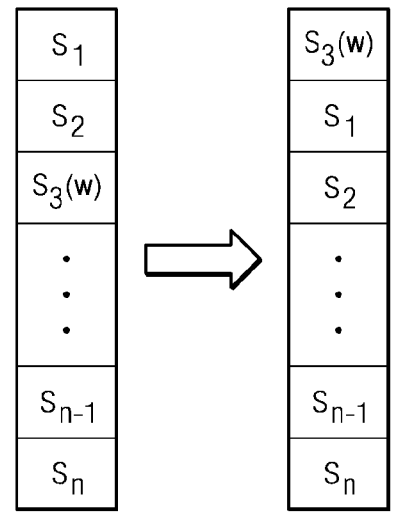

FIGS. 3A and 3B schematically illustrate a normal access operation to assist in explaining illustrative embodiments of the invention. FIG. 3A illustrates the normal access operation when there is a miss, and FIG. 3B illustrates the normal access operation when there is a hit. The normal access operation uses the most-recently used position for placement (MPP) and the least-recently used position for replacement (LRP).

As shown in FIG. 3A, when there is a miss, data element $S_n$ is evicted at the LRU position (the bottom position of the stack) if the cache is full, the other data elements are shifted down by one position, and w, the visited element, is placed in the MRU position (the top position of the stack). As shown in FIG. 3B, when there is a hit, w is found in cache, the elements over w are shifted down by one position, and w is inserted in the MRU position. The search cost is constant for this operation since hardware can check multiple entries in parallel.

Figure 4A:
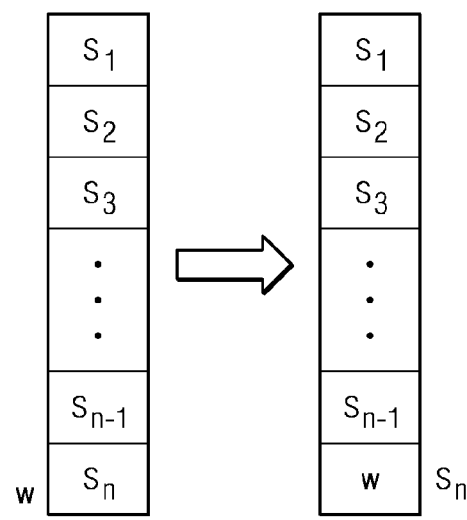
FIGS. 4A and 4B schematically illustrate a bypass access operation in accordance with an illustrative embodiment of the invention.
Figure 4B:
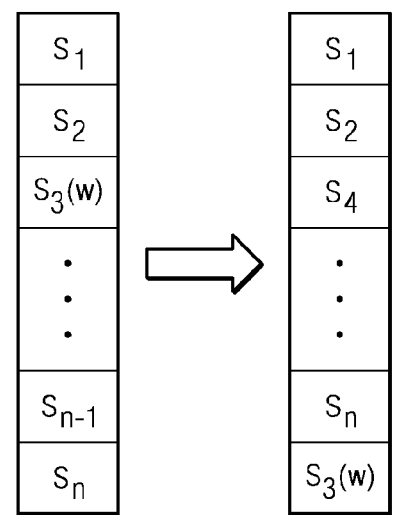

FIGS. 4A and 4B schematically illustrate a bypass access operation in accordance with an illustrative embodiment of the invention. FIG. 4A illustrates the bypass access operation when there is a miss, and FIG. 4B illustrates the bypass access operation when there is a hit. The bypass access operation uses the least-recently used position for placement (LPP) and the same position for replacement (LRP). As shown in FIG. 4A, when there is a miss, $S_n$ is evicted at the LRU position if the cache is full and w is inserted into the LRU position. As shown in FIG. 4B, when there is a hit, w is found, the elements under w are shifted upward by one position, and w is placed in the LRU position.

FIGS. 5A and 5B schematically illustrate a trespass access operation in accordance with an illustrative embodiment of the invention. FIG. 5A illustrates the trespass access operation when there is a miss, and FIG. 5B illustrates the trespass access operation when there is a hit. The trespass access operation uses the most-recently used position for placement (MPP) and the same position for replacement (MRP). Trespass differs from known cache replacement policies because both the cache insertion and evictions happen at one end of the LRU stack. As shown in FIG. 5A, when there is a miss, data element $S_1$ is evicted at the MRU position if the cache is full and w is inserted in the MRU position. As shown in FIG. 5B, when there is a hit, if w is in the MRU position, nothing is done. Otherwise, the data element $S_1$ is evicted at the MRU position, w is inserted there, the elements under the old w are shifted up by one position.

If an access uses the normal operation described above, it is referred to herein as "normal access". Similarly, if an access uses the bypass or trespass operations described above, it is referred to as "bypass access" or "trespass access". As described previously, both bypass access and trespass access have lower overhead than the MIN or OPT schemes.

According to an illustrative embodiment, both the Trespass LRU and the Bypass LRU cache management schemes use a modified OPT cache management scheme, referred to herein as "OPT*," for preprocessing.

OPT* Cache Management Scheme

Given a memory access sequence and a fully associative cache, the original OPT cache management scheme has two passes:

First pass: Compute the forward reuse distance for each access through a backward scan of the trace.

Second pass: Incrementally maintain a priority list based on the forward reuse distance of the cache elements. The second pass involves two steps. First, if the visited element is not in cache, find its place in the sorted list based on its forward reuse distance. Second, after each access, update the forward reuse distance of each cache element.

The update step is costly and is not strictly necessary. To maintain the priority list, it is sufficient to use the next access time instead of the forward reuse distance. Recognizing this fact, the OPT* cache management scheme is as follows.

First pass: Store the next reuse time for each access through a backward scan of the trace.

Second pass: Maintain the priority list based on the next reuse time. The second pass requires only a single step. In particular, if the visited element is not in cache, find its place in the sorted list based on its next access time.

The cost per operation for the OPT* scheme is O (log M) for a cache size of M if the priority list is maintained using a heap. It is asymptotically more efficient than the cost of OPT (O (M) per operation). The difference becomes computationally significant when the cache size C is large. In addition, for the LRU variations according to illustrative embodiments described hereinafter, OPT* is used only for pre-processing and thus poses no burden to on-line cache managements. FIG. 6 illustrates pseudo code for the OPT* cache management scheme according to an illustrative embodiment of the invention.

Bypass LRU Cache Management Scheme

In the Bypass LRU cache management scheme, an access can be either a normal access or a bypass access. To determine the type of each access, OPT* is used in a pre-processing (training) step to simulate a given cache. For each miss in OPT*, let d be the element evicted and x be the last access of d before the eviction. The training step would be tag x as a bypass access. After training, the untagged accesses are normal accesses.

The training step may specify the different bypass operations for different cache sizes. A dependence on cache size is unavoidable for any method to effect optimal caching. The result is portable, which means the performance does not degrade, if an implementation optimized for one cache size is used on a machine with a larger cache. A compiler may generate for a conservative size for some critical parts if not for the whole application. Finally, as described above, the training for all cache sizes can be done in a single pass when the OPT* scheme is used.

FIG. 7 is a table that illustrates an example of Bypass LRU execution, cache size=2, according to an illustrative embodiment of the invention. As shown in FIG. 7, a trace is tagged to have four bypass accesses (designated by "X"). The cache is managed with constant per operation cost as in the known LRU scheme, yet the result is the optimal number of cache misses, the same as MIN scheme.

Bypass LRU is not a stack algorithm. This can be shown by a comparison of FIGS. 8 and 9. In particular, FIG. 8 is a table that illustrates a Bypass LRU, cache size=2 according to an illustrative embodiment of the invention, and FIG. 9 is a table that illustrates a Bypass LRU, cache size=3 according to an illustrative embodiment of the invention. From a review of the tables, it can be seen that the inclusion property does not hold after the first access to e, where the stack contents are given in bold letters, so Bypass LRU is not a stack algorithm.

The Bypass LRU scheme is an optimal cache management scheme. This can be shown by the following proof.

Lemma 1: If the bottom element in the Bypass LRU stack is last visited by a normal access, then all cache elements are last visited by some normal accesses.

Proof: If some data elements are last visited by bypass accesses, then they appear only at the bottom of the stack. They can occupy multiple positions but cannot be shifted up over an element last visited by a normal access. Therefore, if the bottom element is last visited by a normal access, all elements in the cache must also be.

Theorem 1: Bypass LRU generates no more misses than OPT*. In particular, Bypass LRU has a miss only if OPT* has a miss.

Proof: We show that there is no access that is a cache hit in OPT* but a miss in Bypass LRU. Suppose the contrary is true. Let z' be the first access in the trace that hits in OPT* but misses in Bypass LRU. Let d be the element accessed by z', z be the immediate previous access to d, and the reference trace between them be (z, ..., z'). The access z can be one of the two cases.

z is a normal access. For z' to miss in Bypass LRU, there should be a miss y in (z, ..., z') that evicts d. From the assumption that z' is the left most access that is a miss in Bypass LRU but a hit in OPT*, y must be a miss in OPT*. Consider the two possible cases of y.

y occurs when the OPT* cache is not full. Since OPT* cache is always full after the loading of the first M elements, where M is the cache size, this case can happen only at the beginning. However, when the cache is not full, OPT* will not evict any element. Hence this case is impossible.

y occurs when the OPT* cache is full. The element d is at the LRU position before the access of y. By Lemma 1, the Bypass LRU cache is full and the last accesses of all data elements in cache are normal accesses. Let the set of elements in cache be T for Bypass LRU and T* for OPT*. At this time (before y), the two sets must be identical. The reason is a bit tricky. If there is an element d' in the Bypass LRU cache but not in the OPT* cache, d' must be replaced by OPT* before y. However, by the construction of the algorithm, the previous access of d' before y should be labeled a bypass access. This contradicts to the lemma, which says the last access of d' (and all other elements in T) is normal. Since both caches are full, they must be identical, so we have T=T*. Finally, y in the case of OPT* must evict some element. However, evicting any element other than d would violate our lemma. Hence, such y cannot exist and this case is impossible.

z is a bypass access in Bypass LRU. There must be an access y □(z, ..., z') in the case of OPT* that evicts d; otherwise z cannot be designated as a bypass. However, in this case, the next access of d, z' cannot be a cache hit in OPT*, contradicting the assumption that z' is a cache hit in OPT*.

Considering both cases, it is impossible for the same access to be a hit in OPT* but a miss in Bypass LRU.

Corollary 1: Bypass LRU has the same number of misses as OPT* and is therefore optimal.

Proof: From the proof of Theorem 1, if an access is a hit in OPT* then it is a hit in Bypass LRU. The number of misses by Bypass LRU can be no greater than the number of misses in OPT*. On the other hand, OPT* is optimal, and no algorithm has a smaller number of misses. Therefore, Bypass LRU must have the same number of misses as OPT*. In fact, the misses happen for the same accesses.

Corollary 2: Although Bypass LRU is not a stack algorithm, it does not suffer from an anomaly in current systems in which the number of misses sometimes increases when the cache size becomes larger.

Proof: This is because OPT* is a stack algorithm and hence Bypass LRU cannot have Belady anomaly.

Trespass LRU Cache Management Scheme

With the Trespass LRU scheme, an access can be a normal access or a trespass access. For efficient on-line management of a cache stack, the obvious choices for cache replacement are evicting from the top, as in Trespass LRU, and evicting from the bottom as in Bypass LRU. Both are equally efficient, at least asymptotically. The following discussion illustrates the optimality of the Trespass LRU scheme.

As in the Bypass LRU scheme, the Trespass LRU scheme uses a training step based on simulating OPT* for the given cache. For each miss y in OPT*, let d be the evicted cache element and x be the last access of d before y. The training step then tags the access immediately after x as a trespass access. It is trivial to show that such an access exists and is unique for every miss in OPT*. FIG. 10 is a table that illustrates an example of a Trespass LRU execution according to an illustrative embodiment of the invention.

Proof that Trespass LRU is optimal is as follows:

Lemma 2: If a data element w is evicted by a trespass access x, then x happens immediately after the last access of w.

Proof: From the way trespass accesses are identified.

Lemma 3: At the same point in a trace, if an element is in Trespass LRU cache, then it is also in OPT* cache.

Proof: Assume that a data element w is in the Trespass LRU cache but is evicted from the OPT* cache. Let x be the last access of w. Consider the time of the eviction in both cases.

The eviction by Trespass LRU happens right after x. Since the eviction by OPT* cannot be earlier, there must be no period of time when an element w is in the Trespass LRU cache but not in the OPT* cache.

Lemma 4: If a data element is evicted by a normal access in Trespass LRU, then the cache is full before the access. This is obviously true since the normal access cannot evict any element unless the cache is full.

Lemma 5: A normal access cannot evict a data element from cache in Trespass LRU.

Proof: Assume y is a normal access that evicts data w. Let T and T* be the set of data elements in the Trespass LRU cache and the OPT* cache before access y. By Lemma 3, $T \subseteq T^*$ By Lemma 4, the Trespass LRU cache is full before y. Then we have T=T*. OPT*, y has to evict some element $d \square T^*$. Let x be the last access of d before y. Since Trespass LRU evicts d right after x, the content of the cache, T and T* cannot be the same unless y is the next access after x, in which case, d is w, and y must be a trespass access.

Theorem 2: Trespass LRU generates no more misses than OPT*. In particular, Bypass LRU has a miss only if OPT* has a miss.

Proof: We show that there is no access that is a cache hit in OPT* but a miss in Trespass LRU. Suppose the contrary is true. Let z' be the first access in the trace that hits in OPT* but misses in Trespass LRU. Let d be the element accessed by z', z be the immediate previous access to d, and the reference trace between them be (z, . . . y, . . . z'), where y is the access that causes the eviction of d in Trespass LRU. By Lemma 5, y is a trespass access. By Lemma 2, y happens immediately after z. Since y is a trespass after z, then the next access of d, z' must be a miss in OPT*. This contradicts to the assumption that z' is a hit in OPT*.

Therefore, any access that is a miss in Trespass LRU must also be a miss in OPT*.

Corollary 3: Trespass LRU has the same number of misses as OPT* and is therefore optimal.

Proof: It follows from the same argument used in proving Corollary 1. Next we show an important theoretical difference between Trespass LRU and Bypass LRU.

It was previously shown that Bypass LRU is not a stack algorithm. Trespass LRU, however, is a stack algorithm. The proof is as follows.

Assume there are two caches $C_1$ and $C_2$, C2 is larger than $C_1$, and the access sequence is $Q=(x_1, x_2, \ldots, x_n)$. Let $T_1(t)$ be the set of elements in cache $C_1$ after access $x_t$ and $T_2(t)$ be the set of elements in cache $C_2$ after the same access $x_t$. The initial sets for $C_1$ and $C_2$ are $T_1(0)$ and $T_2(0)$, which are empty and satisfy the inclusion property. We now prove the theorem by induction on t.

Assume $T_1(t) \subseteq T_2(t)$ ($1 \leq t \leq n-1$). There are four possible cases based on the type of the access xt+1 when visiting either of the two caches. We denote the data element accessed at time xi as $D(x_i)$.

If $x_{t+1}$ is a trespass access both in $C_1$ and $C_2$, we have $$T_1(t+1) = T_1(t) - D(x_t) + D(x_{t+1}) \subseteq T_2(t) - D(x_t) + D(x_{t+1})$$
$$= T_2(t+1)$$

If $x_{t+1}$ is a trespass access in $C_1$ but a normal access in $C_2$, then by Lemma 5, $x_{t+1}$ does not cause any eviction in cache $C_2$ and therefore $$T_1(t+1) = T_1(t) - D(x_t) + D(x_{t+1}) \subseteq T_2(t) + D(x_{t+1})$$
$$= T_2(t+1)$$

The case that $x_{t+1}$ is a normal access in $C_1$ but a trespass access in $C_2$ is impossible. Since xt+1 is a trespass in $C_2$, $D(x_t)$ would be evicted by some access y in $C_2$ using OPT*. However, $x_{t+1}$ is a normal access in $C_1$, which means that $D(x_t)$ is in $C_1$ after access y when using OPT*. This in turn means that at the point of y, the inclusion property of OPT* no longer holds and contradicts to the fact that OPT* is a stack algorithm.

If $x_{t+1}$ is a normal access both in $C_1$ and $C_2$, then by Lemma 5, $x_{t+1}$ does not cause an eviction either in $C_1$ or $C_2$, and therefore $$T_1(t+1) = T_1(t) + D(x_{t+1}) \subseteq T_2(t) + D(x_{t+1})$$
$$= T_2(t+1)$$

From the induction hypothesis, the inclusion property holds for Trespass LRU for all t.

Corollary 4: Trespass LRU as a cache management algorithm does not suffer from anomaly.

If Trespass LRU is applied to the same sequence for the same two cache sizes as illustrated in FIGS. 8 and 9 for Bypass LRU, the two executions shown in FIGS. 11 and 12 are obtained. In particular, FIG. 11 is a table that illustrates a Trespass LRU, cache size=2 according to an illustrative embodiment of the invention, and FIG. 12 is a table that illustrates a Trespass LRU, cache size=3 according to an illustrative embodiment of the invention.

In contrast to the result of Bypass LRU, the inclusion property now holds. The example also shows that the cache in Trespass LRU can become partially empty after it becomes full. Trespass LRU keeps the visited data element and the data elements to be reused. When the amount of data that have a future reuse is less than the cache size, OPT* and Bypass LRU may contain extra data elements that have no data reuse. In OPT* the extra data do not destroy the inclusion property, but in Bypass LRU they do.

Both Bypass LRU and Trespass LRU provide practical advantages over OPT. In particular, there are two drawbacks for OPT to be used in practice. First, it needs to specify the operation for each access. Second, it requires evicting some data element at an arbitrary position in cache. For the first drawback, loops and inline functions can be unrolled to make a program straight and guarantee each memory reference instruction in binary at most generates only one access at run time. This procedure is not really practical, but the overhead from the second drawback can be seen afterward. To point out the victim in OPT, hardware can't find it automatically unless more fields are added in cache. So some extra computations must be done such as victim address for eviction. The eviction action is also a kind of extra work which is not in the original program.

The first drawback is still present in Bypass LRU and Trespass LRU, but the second drawback is gone. Normal access, bypass access and trespass access are well-defined operations. It does not need to do any extra work because everything is done by each access itself.

Trespass LRU is sensitive to the order of accesses. Thus, it is possible that a trespass access may be executed at an unintended time as a result of instruction scheduling by the compiler and the out-of-order execution by the hardware. In comparison, the effect of a bypass access is not sensitive to such reordering.

The previous description illustrated the potential of Bypass LRU when access type for each access can be controlled. This may not be practical because of severe code size expansion. This problem can be addressed, however, by using a simple transformation to approximate Bypass LRU in program level based on feedback collected in trace level without code size explosion. FIG. 13A illustrates an example of an original Bypass LRU code and FIG. 13B illustrates a transformed Bypass LRU code according to an illustrative embodiment of the invention.

Assume the fully associative cache is 512 lines and each line could contain only one array element. The code illustrated in FIG. 13A suffers substantially from capacity cache misses. There are 10000 cache misses in the total 29910 accesses if using LRU. After OPT and Bypass LRU simulation, some accesses are bypass accesses in Bypass LRU and there are only 5392 cache misses in OPT and Bypass LRU.

Figure 14C:
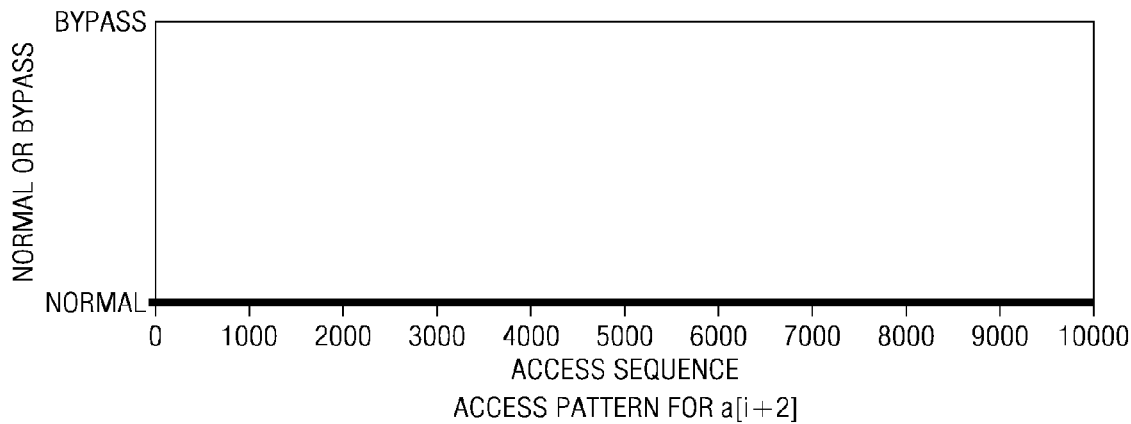

FIGS. 14A, 14B and 14C are diagrams that illustrate whether an access is a bypass access for three references to assist in explaining illustrative embodiments of the present invention. In particular, FIG. 14A illustrates an access pattern for reference a[i+1]; FIG. 14B illustrates an access pattern for reference a[i−1], and FIG. 14C illustrates an access pattern for reference a[i+2]. There are 9970 accesses for each reference. It can be seen after some warm-up accesses all three references have stable patterns about the access type. Reference a[i−1] has a cycle about 997 accesses and there are about 509 normal accesses and about 488 bypass accesses in each cycle. The accesses by a[i−1] are almost normal accesses and the accesses by reference a[i+2] are all normal accesses.

With the cyclic information, the loop is split into two parts as shown in FIG. 14B. In the first loop, all the three references are normal references, which mean the accesses by them are all normal accesses. In the second loop, the references a[i+1] and a[i+2] are still normal references, but reference a[i−1] is a bypass reference, which means the accesses by it are all bypass accesses. After the simple transformation, the cache misses is decreased sharply to 5419, which is near optimal.

Figure 15:
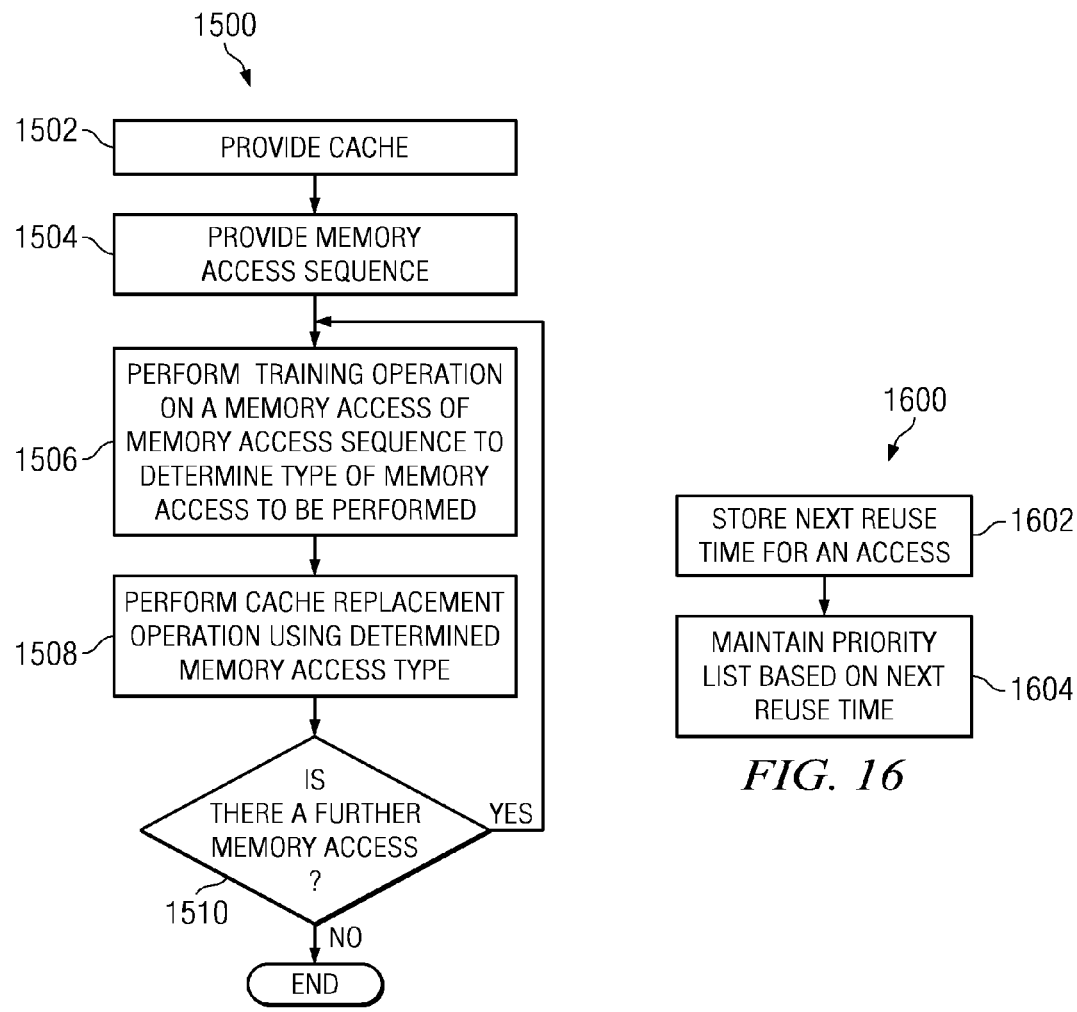
FIG. 15 is a flowchart that illustrates a method for optimal cache management according to an illustrative embodiment of the invention.

FIG. 15 is a flowchart that illustrates a method for optimal cache management according to an illustrative embodiment of the invention, The method can be implemented in a processor unit such as processing unit 204 illustrated in FIG. 2. The method is generally designated by reference number 1500, and begins by providing a cache (Step 1502). In the illustrative embodiment, the cache is viewed as a sorted array of data elements in which a top position of the array is a most recently used position of the array, and a bottom position of the array is a least recently used position of the array. A memory access sequence is also provided (Step 1504). A training operation is then performed with respect to a memory access of the memory access sequence (Step 1506). The training operation is performed in order to determine the type of memory access to be performed with respect to the memory access, In the Bypass LRU cache management scheme, the memory access type can be a normal access type or a bypass access type. In the Trespass LRU cache management scheme, the memory access type can be a normal access type or a trespass access type.

Figure 16:
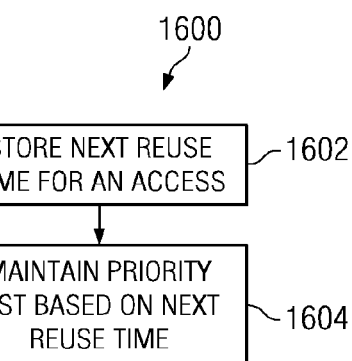
FIG. 16 is a flowchart that illustrates an OPT* training operation according to an illustrative embodiment of the invention.

According to an illustrative embodiment, the training operation performed in Step 1506 is an OPT* operation. FIG. 16 is a flowchart that illustrates an OPT* training operation according to an illustrative embodiment of the invention. The OPT* training operation is generally designated by reference number 1600, and includes a first pass in which a next reuse time for an access is stored through a backward scan of a trace (Step 1602), and a second pass in which a priority list is maintained based on the next reuse time (Step 1604). The next reuse time is used to maintain the priority list rather than forward reuse distance as in the known OPT cache management scheme, resulting in a reduced cost per operation for the OPT* scheme.

Returning to FIG. 15, following the training operation, a cache replacement operation is performed using the memory access type determined to be performed with respect to the memory access (Step 1508). According to illustrative embodiments, the cache replacement operation may utilize either the Bypass LRU cache management scheme or the Trespass LRU cache management scheme.

Following the cache replacement operation in Step 1508, a determination is made whether there are further memory accesses in the memory access sequence (Step 1510), Responsive to a determination that there are further memory accesses in the memory access sequence (Yes output of Step 1510), the method returns to Step 1506). Responsive to a determination that there are no more memory accesses in the memory access sequence (No output of Step 1510), the method ends.

Illustrative embodiments thus provide a computer implemented method, system and computer usable program code for cache management. A cache is provided, wherein the cache is viewed as a sorted array of data elements, wherein a top position of the array is a most recently used position of the array and a bottom position of the array is a least recently used position of the array. A memory access sequence is provided, and a training operation is performed with respect to a memory access of the memory access sequence to determine a type of memory access operation to be performed with respect to the memory access. Responsive to a result of the training operation, a cache replacement operation is performed using the determined memory access operation with respect to the memory access.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for cache management, the computer implemented method comprising:
    providing a cache, wherein the cache is viewed as a sorted array of data elements, wherein a top position of the array is a most recently used position of the array and a bottom position of the array is a least recently used position of the array;
    providing a memory access sequence;
    performing a training operation with respect to a memory access of the memory access sequence to determine a type of memory access operation to be performed with respect to the memory access, wherein performing the training operation comprises storing a next reuse time for an access during a backward scan of a trace and using the next reuse time to maintain a priority list; and
    responsive to a result of the training operation, performing a cache replacement operation using the determined memory access operation with respect to the memory access.

2. The computer implemented method of claim 1, wherein the cache replacement operation comprises a bypass least recently used cache replacement operation, and wherein the type of memory access comprises one of a normal memory access type and a bypass memory access type, wherein:
    for a normal memory access type:
        if there is a miss and the cache is full, a data element in the least recently used position of the array is evicted, other data elements in the array are shifted down the array by one position, and a visited element is placed in the most recently used position of the array; and
        if there is a hit, the visited element is found in the cache, elements over the visited element are shifted down the array by one position, and the visited element is inserted in the most recently used position of the array; and
    for a bypass memory access type:
        if there is a miss, the data element at the least recently used position of the array is evicted if the cache is full, and the visited element is inserted into the least recently used position of the array; and
        if there is a hit, the visited element is found in the array elements under the visited element in the array are shifted upward in the array by one position, and the visited element is placed in the least recently used position of the array.

3. The computer implemented method of claim 1, wherein the cache replacement operation comprises a trespass least recently used cache replacement operation, and wherein the type of memory access comprises one of a normal memory access type and a trespass memory access type, wherein:
    for a normal memory access type:
        if there is a miss and the cache is full, a data element in the least recently used position of the array is evicted, other data elements in the array are shifted down the array by one position, and a visited element is placed in the most recently used position of the array; and
        if there is a hit, the visited element is found in the cache, elements in the array over the visited element are shifted down the array by one position, and the visited element is inserted in the most recently used position of the array; and for a trespass memory access type:
    if there is a miss, a data element at the most recently used position of the array is evicted if the cache is full and a visited element is inserted in the most recently used position of the array; and
    if there is a hit, if the current position of the visited element is not the most recently used position of the array, the data element at the most recently used position of the array is evicted, the visited element is inserted in the most recently used position of the array, and elements under the current position are shifted up the array by one position.

4. The computer implemented method of claim 3, wherein for a trespass memory access type:
    if there is a hit and the current position of the visited element is the most recently visited position of the array, no changes are made to the positions of elements in the array.

5. The computer implemented method of claim 1, wherein the type of memory access operation is determined according to a size of the cache.

6. The computer implemented method of claim 1, wherein the cache replacement operation comprises an optimal cache replacement operation.

7. The computer implemented method of claim 1, and further comprising:
    determining if there is a further memory access in the memory access sequence; and
    in response to determining that there is a further memory access in the memory access sequence, performing the training operation and the cache replacement operation with respect to the further memory access.

8. A computer program product stored in a non-transitory computer recordable storage medium having computer usable program code embodied therein for cache management, the computer program product comprising:
    computer usable program code configured for providing a cache, wherein the cache is viewed as a sorted array of data elements, wherein a top position of the array is a most recently used position of the array and a bottom position of the array is a least recently used position of the array;
    computer usable program code configured for providing a memory access sequence;
    computer usable program code configured for performing a training operation with respect to a memory access of the memory access sequence to determine a type of memory access operation to be performed with respect to the memory access, wherein the training operation comprises computer usable program code configured for storing a next reuse time for an access during a backward scan of a trace and using the next reuse time to maintain a priority list; and
    computer usable program code, responsive to a result of the training operation, configured for performing a cache replacement operation using the determined memory access operation with respect to the memory access.

9. The computer program product of claim 8, wherein the computer usable program code configured for performing a cache replacement operation comprises computer usable program code configured for performing a bypass least recently used cache replacement operation, and wherein the type of memory access comprises one of a normal memory access type and a bypass memory access type, wherein:
    for a normal memory access type, the computer usable program code is configured for:
        if there is a miss and the cache is full, a data element in the least recently used position of the array is evicted, other data elements in the array are shifted down the array by one position, and a visited element, is placed in the most recently used position of the array; and
        if there is a hit, the visited element is found in the cache, elements over the visited element are shifted down the array by one position, and the visited element is inserted in the most recently used position of the array; and
    for a bypass memory access type, the computer usable program code is configured for:
        if there is a miss, the data element at the least recently used position of the array is evicted if the cache is full, and the visited element is inserted into the least recently used position of the array; and
        if there is a hit, the visited element is found in the array, elements under the visited element in the array are shifted upward in the array by one position, and the visited element is placed in the least recently used position of the array.

10. The computer program product of claim 8, wherein the computer usable program code configured for performing a cache replacement operation comprises computer usable program code configured for performing a trespass least recently used cache replacement operation, and wherein the type of memory access comprises one of a normal memory access type and a trespass memory access type, wherein:
    for a normal memory access type, the computer usable program code is configured for:
        if there is a miss and the cache is full, a data element in the least recently used position of the array is evicted, other data elements in the array are shifted down the array by one position, and a visited element, is placed in the most recently used position of the array; and
        if there is a hit, the visited element is found in the cache, elements in the array over the visited element are shifted down the array by one position, and the visited element is inserted in the most recently used position of the array; and
    for a trespass memory access type, the computer usable program code is configured for:
        if there is a miss, a data element at the most recently used position of the array is evicted if the cache is full and a visited element is inserted in the most recently used position of the array; and
        if there is a hit, if the current position of the visited element is not the most recently used position of the array, the data element at the most recently used position of the array is evicted, the visited element is inserted in the most recently used position of the array, and elements under the current position are shifted up the array by one position.

11. The computer program product of claim 10, wherein for a trespass memory access type, the computer usable program code is configured for:
    if there is a hit and the current position of the visited element is the most recently visited position of the array, no changes are made to the positions of elements in the array.

12. The computer program product of claim 8, wherein the type of memory access operation is determined according to a size of the cache.

13. The computer program product of claim 8, wherein the cache replacement operation comprises an optimal cache replacement operation.

14. The computer program product of claim 8, and further comprising:
  computer usable program code configured for determining if there is a further memory access in the memory access sequence; and
  in response to determining that there is a further memory access in the memory access sequence, computer usable program code configured for performing the training operation and the cache replacement operation with respect to the further memory access.

15. A data processing system for managing a cache, comprising:
  a bus system;
  a storage device connected to the bus system, wherein the storage device includes a set of instructions; and
  a processing unit connected to the bus system, wherein the processing unit executes the set of instructions to provide a cache, wherein the cache is viewed as a sorted array of data elements, wherein a top position of the array is a most recently used position of the array and a bottom position of the array is a least recently used position of the array; provide a memory access sequence; perform a training operation with respect to a memory access of the memory access sequence to determine a type of memory access operation to be performed with respect to the memory access, wherein the training operation comprises storing a next reuse time for an access during a backward scan of a trace and using the next reuse time to maintain a priority list; and responsive to a result of the training operation, perform a cache replacement operation using the determined memory access operation with respect to the memory access.

16. The data processing system of claim 15, wherein the cache replacement operation comprises a bypass least recently used cache replacement operation, and wherein the type of memory access comprises one of a normal memory access type and a bypass memory access type, wherein the processing unit further executes the set of instructions to:
  for a normal memory access type:
    if there is a miss and the cache is full, evict a data element in the least recently used position of the array, shift other data elements in the array down the array by one position, and place a visited element in the most recently used position of the array; and
    if there is a hit, find the visited element in the cache, shift elements over the visited element down the array by one position, and insert the visited element in the most recently used position of the array; and
  for a bypass memory access type:
    if there is a miss, evict the data element at the least recently used position of the array if the cache is full, and insert the visited element into the least recently used position of the array; and
    if there is a hit, if the visited element is found in the array, shift elements under the visited element in the array upward in the array by one position, and place the visited element in the least recently used position of the array.

17. The data processing system of claim 15, wherein the cache replacement operation comprises a trespass least recently used cache replacement operation, and wherein the type of memory access comprises one of a normal memory access type and a trespass memory access type, wherein the processing unit further executes the set of instructions to:
  for a normal memory access type:
    if there is a miss and the cache is full, evict a data element in the least recently used position of the array, shift other data elements in the array down the array by one position, and place a visited element in the most recently used position of the array; and
    if there is a hit, find the visited element in the cache, shift elements in the array over the visited element down the array by one position, and insert the visited element in the most recently used position of the array; and
  for a trespass memory access type:
    if there is a miss, evict a data element at the most recently used position of the array if the cache is full and insert a visited element in the most recently used position of the array; and
    if there is a hit, if the current position of the visited element is not the most recently used position of the array, evict the data element at the most recently used position of the array, insert the visited element in the most recently used position of the array, and shift elements under the current position up the array by one position.

* * * * *